United States Patent [19]
Nagai

[11] 3,988,938
[45] Nov. 2, 1976

[54] GATE MOTION MECHANISM
[75] Inventor: Seiji Nagai, Hiroshima, Japan
[73] Assignee: Mitsubishi Jukogyo Kabushiki Kaisha, Tokyo, Japan
[22] Filed: June 5, 1975
[21] Appl. No.: 583,967

[30] Foreign Application Priority Data
Jan. 30, 1975 Japan................................ 50-12688

[52] U.S. Cl..................................... 74/53; 74/110; 214/1 BB
[51] Int. Cl.².......................................... F16H 25/12
[58] Field of Search................. 74/53, 54, 56, 99 R, 74/110, 436; 33/1; 214/1 BB

[56] References Cited
UNITED STATES PATENTS

| | | |
|---|---|---|
| 3,135,123 | 6/1964 | Spanke et al. ........................... 74/53 |
| 3,751,996 | 8/1973 | Beezer .................................... 74/53 |
| 3,779,089 | 12/1973 | Beezer .................................... 74/53 |
| 3,881,362 | 5/1975 | Beezer .................................... 74/53 |

*Primary Examiner*—C. J. Husar
*Attorney, Agent, or Firm*—George B. Oujevolk

[57] ABSTRACT

A gate motion mechanism for continuously driving an arm to perform a gate motion, or a combination of two or more differently directed rectilineal motions, has a cam groove or grooves of a contour corresponding to the path of motion the arm is to follow, and a guide roller or rollers integrally connected to the arm, each of the roller being fitted in the cam groove and linked to a driving mechanism via a lever for sliding movement along the groove.

5 Claims, 4 Drawing Figures

3,988,938

GATE MOTION MECHANISM

BACKGROUND OF THE INVENTION

This invention relates to a gate motion mechanism for continuously performing a combination of two or more rectilineal motions as, for example, drawing an inverted letter "U".

Automatized devices for setting proper parts on workpieces to be machined include the gate motion mechanism. As shown typically in FIG. 1, the conventional mechanism has an arm 1 carrying a chuck 2 and a pair of jaws 2a thereunder. An inverted U-shaped gate motion of the arm 1, as indicated by arrows 6, enables one of parts 4 held in a row on a part chute 3 to be picked up by the jaws 2a and set in a corresponding dent of work 5.

It is known in the art that the mechanism for forcing such gate motion is of a construction as illustrated in FIG. 2. It comprises a shaft 10 to be rotated by a drive not shown, a cross feed cam 11 and a vertical feed cam 12 both of which are fixedly mounted on the shaft for rotation therewith, and levers 13, 14 slidable, respectively, along cam grooves 11a, 12a of the cams to transmit certain motions to guide rods 15 and a cross slide 17. Since the movement of the guide rods 15 is guided by the cross slide 17 supported by a slide bar 16, a head 18 secured to the front ends of the guide rods 15 makes a given gate motion. The cross feed cam 11 forces the lever 13 to move the guide rods 15 backward and forward, while the vertical feed cam 12 forces the lever 14 to move the cross slide 17 upward and downward. Consequently, the head 18 combines the back-and-forth motion of the guide rods 15 and the up-down motion of the cross slide 17 into a gate motion reciprocatingly along the full and broken lines indicated by arrows 19, 19a.

The known gate motion mechanism requires cams, levers, and other associated parts all in pairs. This complicates the construction and makes the arrangement large in size, occupying a great deal of space.

SUMMARY OF THE INVENTION

It is an object of the present invention to eliminate the foregoing disadvantages of the prior art arrangements and provide a gate motion mechanism simplified in construction and which lends itself easily to standardization. According to the invention, there is provided a gate motion mechanism for continuously driving an arm to perform a gate motion, or a combination of two or more differently directed rectilineal motions, characterized in that the frame for the mechanism is formed with a cam groove of a contour corresponding to the path of motion which the arm follows, and a guide roller is integrally connected to the arm and fitted in the cam groove and linked to a driving mechanism via a lever for sliding movement along the groove.

Another object of the invention is to provide a gate motion mechanism having two or more cam grooves, each of which receives a guide roller connected to a common arm so that heavy loads can be satisfactorily handled by gate motion.

Means for driving the guide rollers along the cam grooves may take varied forms. If one or two such guide rollers are attached to the common arm, it is desirable that the rollers carry bifurcated levers having pinion gears in mesh with a drive gear which, in turn, is driven by a separate driving mechanism.

Various other drive means may be employed for the guide rollers provided that they permit the rollers to move along the cam grooves. For example, it is possible to connect the pinion gears or levers directly to the driving mechanism instead of having the pinion gears driven by the drive gear.

Still another object of the invention is to provide a gate motion mechanism in which the cam groove or grooves to be formed on the inner wall of the frame are readily changeable according to the path for movement required for the arm of the gate motion mechanism.

The gate motion mechanism of the invention offers advantages in that the mechanism is compact and simple in construction, the cam grooves can be changed as desired to meet various gate motion requirements, and the standardization of the mechanism can be easily accomplished.

BRIEF DESCRIPTION OF THE DRAWINGS

The above and other objects, advantages, and features of the present invention will more fully appear from the following description taken in connection with the accompanying drawings showing an embodiment thereof. In the drawings.

DETAILED DESCRIPTION OF THE PREFERRED EMBODIMENT

Figure 1:
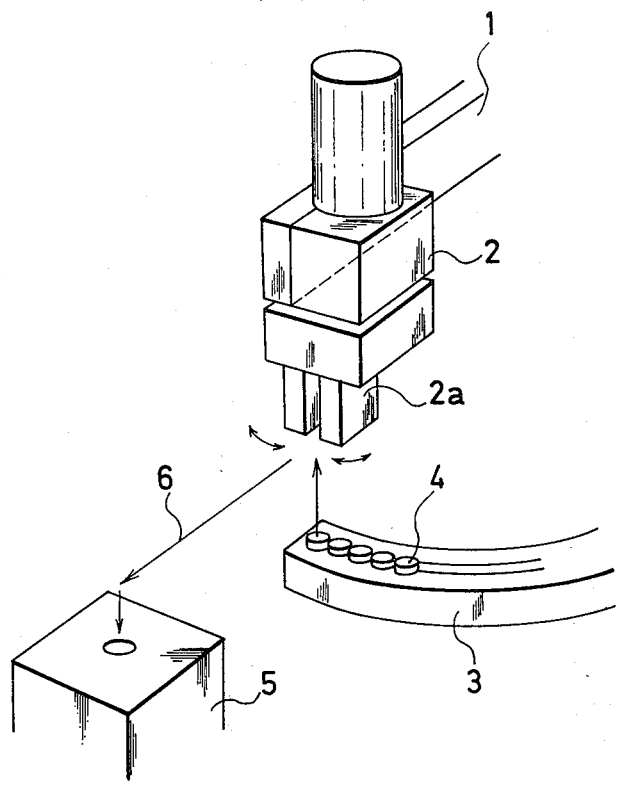
FIG. 1 is a perspective view illustrating the principles of gate motion at work.
Figure 2:
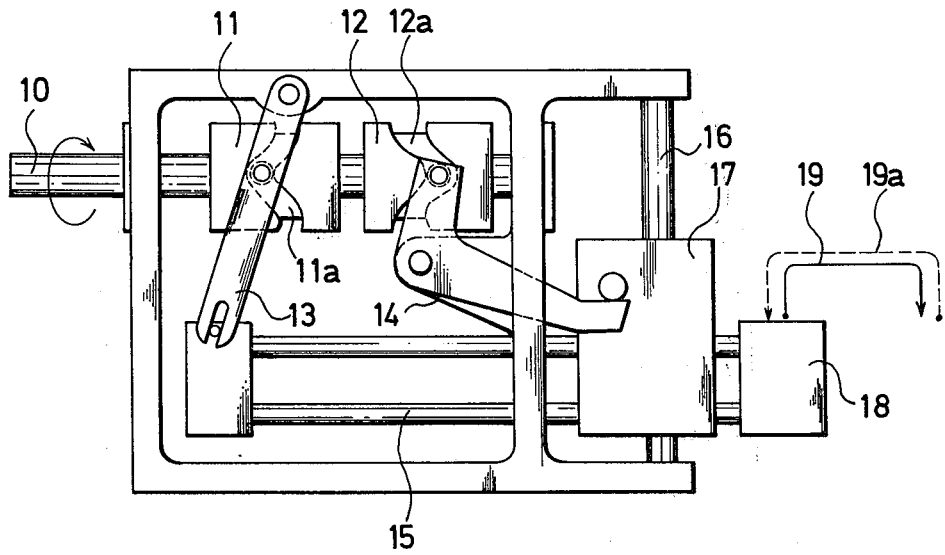
FIG. 2 is a diagrammatic side view of a prior art gate motion mechanism.
Figure 3:
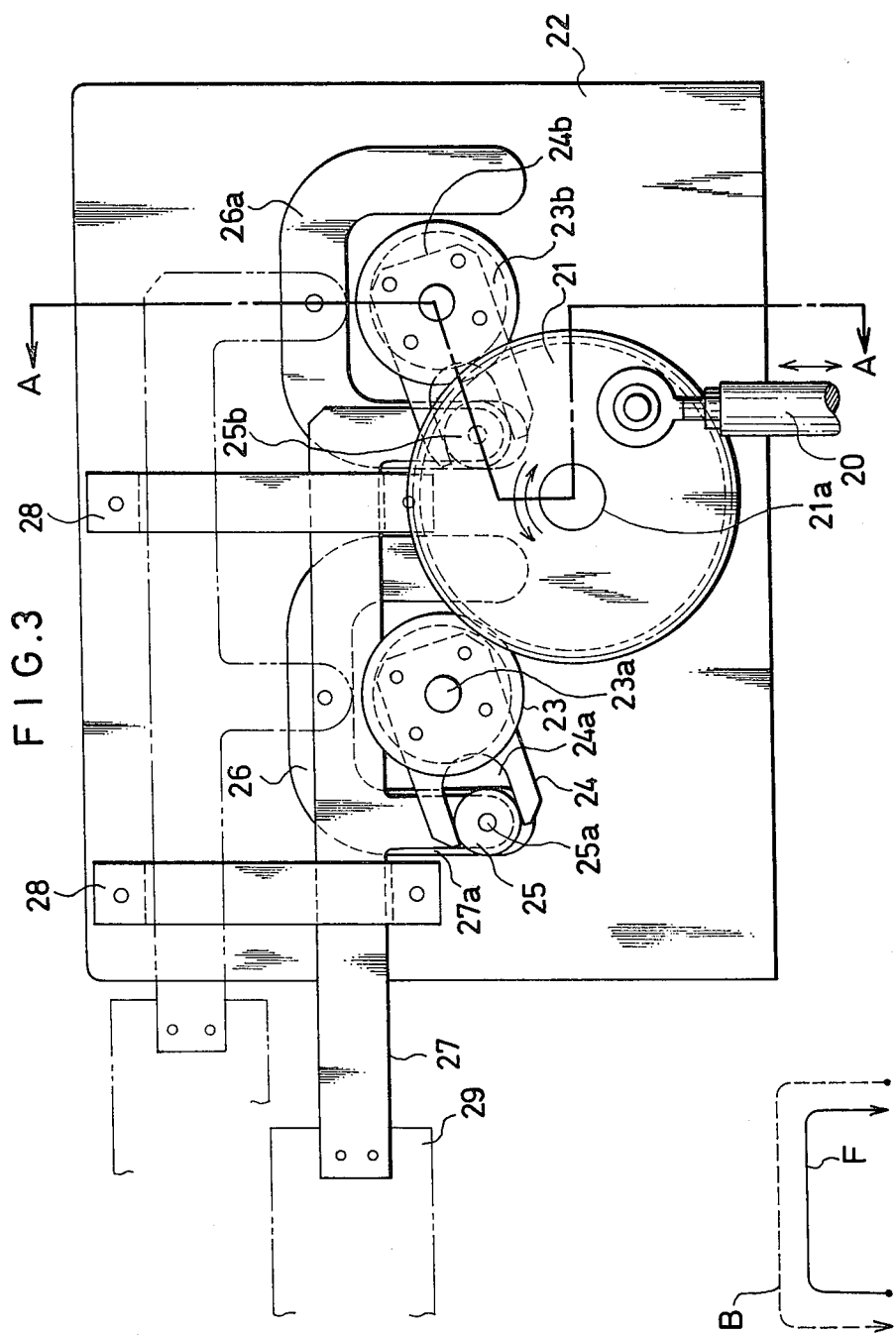
FIG. 3 is a diagrammatic side view of a gate motion mechanism embodying the invention, with the housing removed to show the internal structure.
Figure 4:
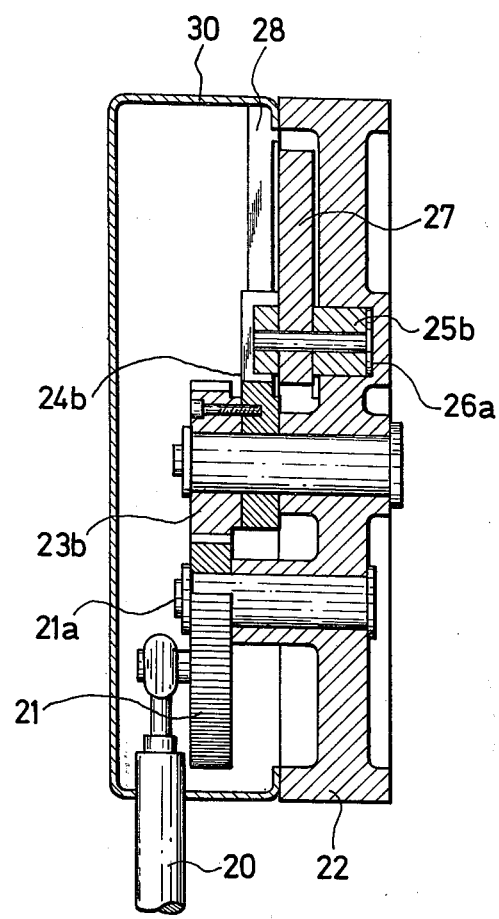
FIG. 4 is a cross sectional view taken on the line A—A of FIG. 3, with the lever turned to an intermediate point to better illustrate the construction.

Referring to FIGS. 3 and 4, there is shown a gate motion mechanism as comprising a rod 20, a drive gear 21, a frame 22, pinion gears 23, 23b, bifurcated levers 24, 24b, guide rollers 25, 25b, the frame being formed with cam grooves 26, 26a, and a gate motion arm 27. The rod 20 is pivotally connected to the drive gear 21 at one end, the end being linked to a drive not shown for straight reciprocating motion. Thus, the drive gear 21, which is rotatably supported by the frame with a pin 21a, is caused to follow an arcuate path reciprocatingly. Similarly, the pinion gear 23 is rotatably pivoted by the frame 22 with a pin 23a and is meshed with the drive gear 21. In this way the pinion gear 23 permits the bifurcated lever 24 secured thereto to reciprocate along an arcuate path. The rod 20, drive gear 21, and pinion gear 23 constitute the driving mechanism in the embodiment of the invention.

The frame 22 is formed with the cam groove 26 of a contour corresponding to the path along which the gate motion arm 27 is to move. The guide roller 25 is partly fitted in the cam groove 26 and is held in the recess 24a formed at the bifurcated end of the lever 24, so that the reciprocatory motion of the lever 24 causes the guide roller 25 to run along the cam groove 26. The recess 24a is provided with a sufficient clearance longitudinally to ensure smooth motion of the guide roller 25 that combines rectilineal motions, while the lever 24 follows an arcuate path. The distance of reciprocatory motion of the drive gear can be adjusted as desired, in consideration of the contour of the cam groove 26 (i.e., the path of the guide roller 25) and the gear ratio of the drive gear 21 to the pinion gear 23.

The driving mechanism need not be restricted to the construction described. Only if the afore-described motion of the guide roller 25 is made possible, any known mechanism, for example of the type capable of directly driving the pinion gear 23 or lever 24, may be adopted.

A downward protrusion 27a integrally extending from the arm 27 is secured to the guide roller 25 with a pin 25a. A pair of guide plates 28 fixed at both ends to the frame 22 confine the motion of the arm 27 within a plane. At the free end of the arm 27 is fixed a head 29. A case 30 shown in FIG. 4 serves as a dustproof cover.

The cam groove 26a, guide roller 25b, bifurcated lever 24b, and pinion gear 23b are replicas, respectively, of the cam groove 26, guide roller 25, lever 24, and pinion gear 23. When two such cam grooves are formed, the motion of the arm 27 will be accordingly smoothened. However, there is no special limitation to the number of grooves. If the load the head 29 is to bear is light, one cam groove will suffice for the purpose, and if the load is heavy, three or more may be provided according to the cases.

With the construction described, the gate motion mechanism according to the invention operates as follows. If the rod 20 is moved upward, the drive gear 21 will rotate counter-clockwise and the pinion gears 23, 23b will rotate clockwise, forcing the guide rollers 25, 25b along the cam groove 26, 26a, respectively. Consequently, the arm 27 will first move straightly upward, turn to a horizontal direction as indicated by an imaginary line in FIG. 3, and then move straightly downward, thus completing a gate motion in one direction F. Next, downward movement of the rod 20 will cause the arm to repeat the gate motion in the backward direction B.

As stated above, the gate motion mechanism according to the present invention is simple and compact in construction because it uses a single type of cam groove to enable the arm to perform a given gate motion therealong, and is easily standardizable in that varied gate motions are made possible by merely changing the cam groove contour.

What is claimed is:
1. In a gate motion mechanism for continuously driving an arm to perform a gate motion, or a combination of two or more differently directed rectilineal motions, which has a cam groove of a contour corresponding to the path of motion which the arm follows, and a guide roller integrally connected to the arm and fitted in the cam groove and linked to a driving mechanism via a lever for sliding movement along the groove, the improvement therein, wherein the driving mechanism comprises a rod to be driven reciprocatingly by a separate driving mechanism, a drive gear pivotally supporting one end of the rod and rotatably pivoted by a frame, and a pinion gear secured to the lever in mesh with the drive gear.

2. A gate motion mechanism according to claim 1 which also comprises guide plates attached to the frame to ensure smooth, confined motion of the arm therethrough.

3. A gate motion mechanism according to claim 1 wherein the cam groove formed on the frame is replaced by a plurality of grooves of the same contour, the guide roller is slidably fitted in each of the grooves, and a plurality of such guide rollers are connected in common to the arm and are driven at the same time by the driving mechanism.

4. A gate motion mechanism according to claim 1 wherein the driving mechanism directly drives the lever or pinion gear.

5. A gate motion mechanism according to claim 1 wherein the contour of the cam groove or grooves can be changed correspondingly to the desired path of motion that the arm is to follow.

* * * * *